United States Patent Office.

CARL STRAUB, OF SYRACUSE, NEW YORK, ASSIGNOR TO THE ADAMANT MANUFACTURING COMPANY, OF SAME PLACE.

COMPOSITION OF BUILDING MATERIAL FOR ARCHITECTURAL PURPOSES.

SPECIFICATION forming part of Letters Patent No. 394,518, dated December 11, 1888.

Original application filed February 25, 1888, Serial No. 265,305. Divided and this application filed June 11, 1888. Serial No. 276,729. (No specimens.)

*To all whom it may concern:*

Be it known that I, CARL STRAUB, of Syracuse, in the county of Onondaga, in the State of New York, have invented new and useful Improvements in Composition of Building Materials for Architectural Purposes, of which the following is a full, clear, and exact description.

This invention is a division of my application for patent, Serial No. 265,305, filed February 25, 1888; and it consists in the addition to the composition of matter described in said application of a proper amount of clay or marl, which imparts to the composition a consistency which allows it to be treated more easily with the trowel, and is better adapted for producing a very smooth finishing-coat of plastering.

In forming my improved composition of matter I first proceed in the same manner as described in my pending application for Letters Patent aforesaid, to wit: I dissolve a gelatinous or glutinous substance, preferably glue, in sufficient water to render it fluid. I generally add thereto oil or fat, which may be either mineral, vegetable, or animal, either in the raw or refined state, although in practice I prefer to use boiled linseed-oil, the quantity of oil to be about one-tenth in weight of that of the glue and water. If desirable, however, the oil may be entirely omitted; but a more durable and better material will result from its use. I then add to the fluid thus formed acid or acids in quantity equal to about one-fifth in weight of that of the glue and water. Any of those acids may be used when either consists of or contains hydrocarbon compounds or oxygen hydrocarbon compounds and forms, in combination with oil or glue, or both, carbonic acids. Therefore either oxalic or tartaric or nitric or phosphoric acid or acetum may be used. I prefer, however, to use either muriatic or sulphuric acid, or both. When both are used, the relative proportions should be about one part of sulphuric to about four parts of muriatic in weight. If sulphuric alone be used, the quantity thereof should be about one-sixteenth in weight of that of the glue and water. The mixture thus formed should be thoroughly stirred while subjected to artificial heat sufficient to keep it above the boiling-point for at least an hour, after which it is allowed to stand until cooled. The process of cooling may be accelerated by artificial means, and it is better that it be occasionally stirred while cooling.

With the aforesaid liquid compound I mix a suitable quantity of any calcareous mineral substance comminuted or reduced to more or less fine particles. In practice I prefer to dilute the aforesaid liquid by adding about fifty or sixty pounds of water to about three or four pounds of said liquid, and with this diluted liquid I then mix from ninety to one hundred and twenty pounds of the said comminuted mineral matter, for which latter I prefer calcined sulphate of lime, either alone or with calcined carbonate of lime, in about the proportions of ten to twenty parts of the former to one part of the latter. The proportions of said liquid water and mineral matter may be varied somewhat, according to the consistency and strength desired of the material in which it is to be used. The said mineral matter is to be sifted or stirred into the liquid, and the mixture produced will be a more or less pasty mass. This mass is then allowed to dry or may be dried by any suitable method and means of applying artificial heat, after which it is to be pulverized. This dry pulverized composition of matter may be mixed with sufficient water to convert it into a plastic substance, which is suitable for molding or otherwise working into articles of ornamentation for decorating walls, floors, and ceilings of buildings, and may also be applied to the same as a covering. It may also be added to any cement, plaster, or mortar which requires water as a solvent, and will be found to increase their strength, cohesiveness, and durability. It may also be used as a cement for architectural purposes.

In some instances a less expensive material is desired for certain purposes. To meet this requirement, I proceed further in preparing the compound as follows: I take about twenty-four pounds of the dry composition of matter last above described and add thereto about three hundred and seventy-five pounds of any pulverized mineral substance—such as marble, stone, or common sand, &c.—to be thoroughly commingled with the aforesaid dry compound.

The composition thus formed, when mixed with sufficient water to render it plastic, is particularly well adapted for producing a smooth hard and durable coating for walls, ceilings, and the like, and may also be molded or worked into shapes and forms for interior and exterior decorations of buildings; or it may be used as a mortar or cement for either brick or stone masonry.

For some specific purposes I add to the aforesaid composition of matter a suitable quantity of any vegetable fiber in proper condition to allow it to be thoroughly incorporated with the former in the dry state before the addition of water. The quantity may be greatly varied; the more porous the fiber the less should be used. This material, when reduced to a plastic state by the addition of water, may be used for the same purposes as hereinbefore stated, where a weaker material will answer the purpose, said fiber tending to impart more elasticity to the structure formed of the mass, and it is therefore very desirable for first-coat work in covering walls, &c.

In order to produce a very smooth surface of the structure, I add a suitable amount of clay or marl. Any person familiar with the use of this class of cements or plasters can readily determine the proper amount of clay or marl to be used.

What I claim as my invention is—

1. The composition of matter consisting of dissolved glue or gelatinous substance, acid or acids, comminuted calcareous mineral, and marl, substantially as specified.

2. The composition of matter consisting of dissolved glue or gelatinous substance, acid, oil or fat, comminuted calcareous mineral, and marl, substantially as set forth.

3. The composition of matter consisting of dissolved glue or gelatinous substance, acid, oil or fat, comminuted calcareous mineral, sand, and marl, substantially as specified.

In testimony whereof I have hereunto signed my name, in the presence of two witnesses, at Syracuse, in the county of Onondaga, in the State of New York, this 8th day of June, 1888.

CARL STRAUB. [L. S.]

Witnesses:
MARK W. DEWEY,
JOHN J. LAASS.